United States Patent
Endoh

(10) Patent No.: US 7,236,449 B2
(45) Date of Patent: Jun. 26, 2007

(54) OPTICAL RECORDING MEDIUM, STAMPER FOR PRODUCING OPTICAL RECORDING MEDIUM, RECORDING/REPRODUCING APPARATUS, AND RECORDING/REPRODUCING METHOD

(75) Inventor: Sohmei Endoh, Miyagi (JP)

(73) Assignee: Sony Corporation, Tokyo (JP)

( * ) Notice: Subject to any disclaimer, the term of this patent is extended or adjusted under 35 U.S.C. 154(b) by 467 days.

(21) Appl. No.: 10/508,089

(22) PCT Filed: Dec. 25, 2003

(86) PCT No.: PCT/JP03/16732

§ 371 (c)(1),
(2), (4) Date: Sep. 16, 2004

(87) PCT Pub. No.: WO2004/072968

PCT Pub. Date: Aug. 26, 2004

(65) Prior Publication Data

US 2005/0157632 A1    Jul. 21, 2005

(30) Foreign Application Priority Data

Feb. 14, 2003   (JP) .............................. 2003-036348

(51) Int. Cl.
*G11B 7/24* (2006.01)

(52) U.S. Cl. .................................... 369/275.4; 369/277

(58) Field of Classification Search .. 369/275.1–275.5, 369/109.01, 111, 277–280, 283, 286, 13.55, 369/13.56, 44.26, 44.13, 109.02; 428/64.4, 428/64.1, 64.3

See application file for complete search history.

(56) References Cited

U.S. PATENT DOCUMENTS

| | | | | |
|---|---|---|---|---|
| 6,477,136 | B2 * | 11/2002 | Sakurai et al. | 369/275.4 |
| 6,762,989 | B2 * | 7/2004 | Hirokane et al. | 369/275.4 |
| 6,791,938 | B2 * | 9/2004 | Endoh | 369/275.4 |
| 6,819,650 | B2 * | 11/2004 | Deno et al. | 369/275.4 |
| 6,999,405 | B2 * | 2/2006 | Endoh | 369/275.4 |
| 7,038,998 | B2 * | 5/2006 | Fujita et al. | 369/275.4 |
| 2002/0024915 | A1 * | 2/2002 | Endoh | 369/109.02 |
| 2004/0022162 | A1 | 2/2004 | Endoh et al. | 369/109.01 |
| 2004/0151106 | A1 | 8/2004 | Endoh | 369/111 |

FOREIGN PATENT DOCUMENTS

JP    2003-22575    1/2003

* cited by examiner

*Primary Examiner*—Ali Neyzari
(74) *Attorney, Agent, or Firm*—Oblon, Spivak, McClelland, Maier & Neustadt, P.C.

(57) ABSTRACT

On a magneto-optical disk, a first groove Gv1, a second groove Gv2, and a third groove Gv3 are formed so as to be adjacently arranged. The first groove Gv1 and the second groove Gv2 are deep grooves, and the third groove Gv3 is a shallow groove. The first groove Gv1 and the second groove Gv2 are formed by being wobbled. Data is recorded on four recording tracks of the two deep grooves and two lands between the deep grooves and the shallow groove. A CTS signal is obtained by a sum signal (A+B+C+D) of a photo-detector 6, and a push-pull signal is obtained by a difference signal (A+D)−(B+C) of a photo-detector 8.

16 Claims, 7 Drawing Sheets

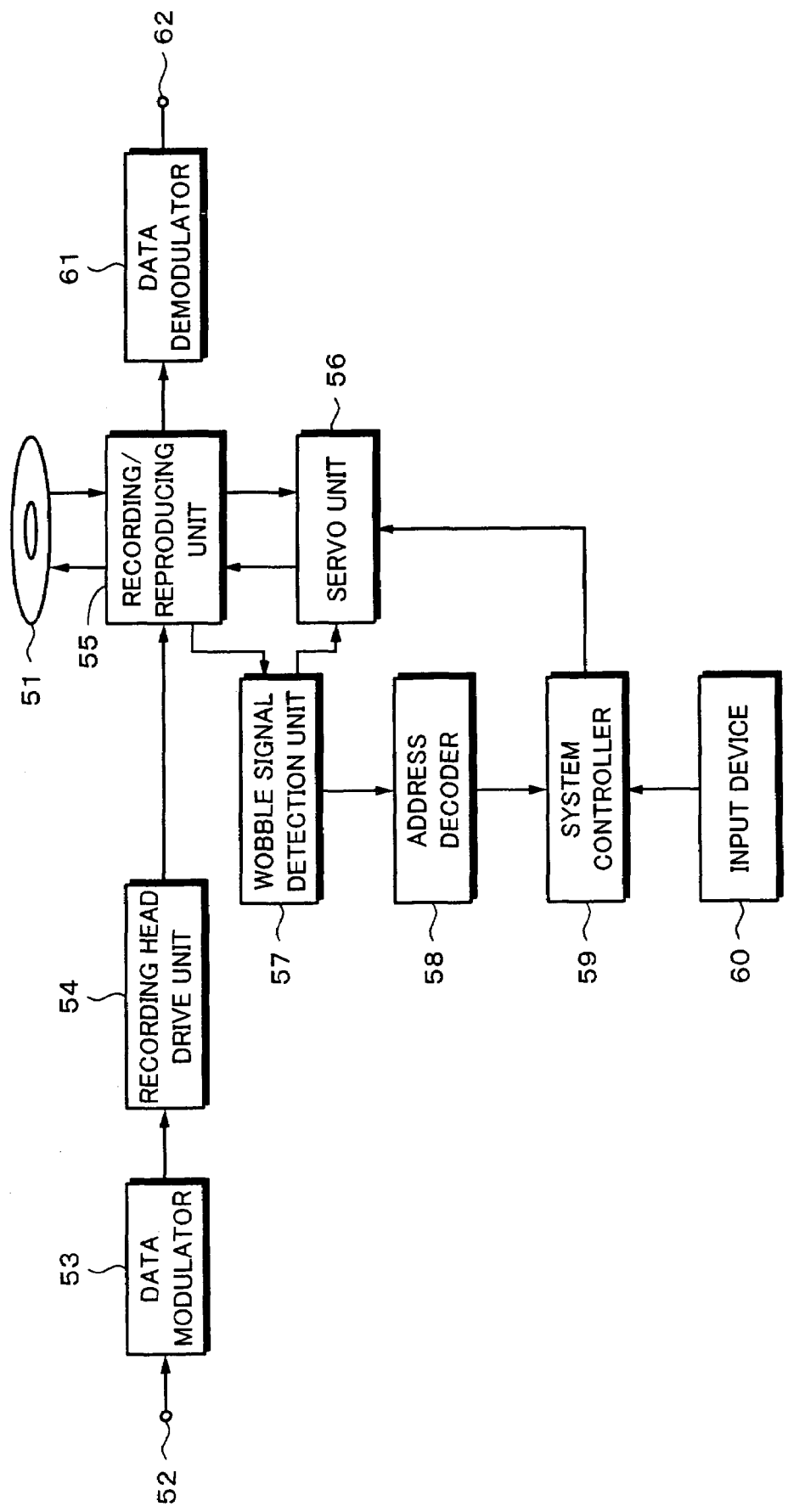

OPTICAL RECORDING MEDIUM, STAMPER FOR PRODUCING OPTICAL RECORDING MEDIUM, RECORDING/REPRODUCING APPARATUS, AND RECORDING/REPRODUCING METHOD

TECHNICAL FIELD

The present invention relates to an optical recording medium having grooves formed along recording tracks and a master for optical recording medium manufacture used when manufacturing such an optical recording medium. Further, the invention relates to a recording/reproducing apparatus and a recording/reproducing method for performing recording and/or reproduction processing on an optical recording medium having grooves formed along recording tracks.

BACKGROUND ART

As conventional recordable disk-shape recording media, an MD (Mini Disc), a CD (Compact Disc)-R (Recordable), a CD-RW (ReWritable), a DVD (Digital Versatile Disc or Digital Video Disc)+RW (ReWritable), a DVD-R (Recordable), a DVD-RW (ReWritable), etc. are proposed. For formats of these disk-shape recording media, a groove recording format for recording in grooves is adopted.

For each format of an magneto-optical (MO) disk of ISO (International Organization for Standardization), a land recording format for recording in lands (between grooves) is proposed. In a DVD-RAM (Digital Video Disc-Random Access Memory) and the like, as one method for realizing higher density of an optical disk, a system (land and groove recording) for providing higher density by doubling the track density of the conventional one by recording in both grooves and between grooves (lands) is proposed. Here, the grooves refer to so-called guide grooves formed along recording tracks for mainly enabling tracking servo. The near part seen from an optical pickup is referred to as "groove", and the far part is referred to as "land". Note that the part between the grooves is referred to as "land".

As shown in FIG. 1, in an optical recording medium having grooves formed, normally, tracking servo is performed using a push-pull signal. The push-pull signal refers to a difference signal, and is obtained by applying a light beam to the optical recording medium, detecting the light formed from the light beam reflected by the optical recording medium by two photo-detectors A and B disposed symmetrically relative to the track center, and calculating the difference (A−B) of outputs from these two photo-detectors A and B.

The reflected light amount of the light formed from the light beam reflected by the optical recording medium is detected as a sum (A+B) of the two photo-detectors. Here, a signal formed by detecting the reflected light amount of the light formed from the light beam reflected by the optical recording medium, that is, a sum signal of the outputs from the two photo-detectors A and B is a signal used for detecting how many tracks a spot of the light beam traverses when the spot moves, and generally referred to as "cross track signal (CTS)".

In an MD or a CD-R, a ratio of "groove width/track pitch" is selected as on the order of 1/3 or 2/3 so that the push-pull signal and the CTS signal may be obtained sufficiently. That is, in the case of an MD, "groove width/track pitch"=1.1 µm/1.6 µm=69%, and, in the case of a CD-R, "groove width/track pitch"=0.5 µm/1.6 µm=31%

Furthermore, as a technology for improving linear recording density, DWDD (Domain Wall Displacement Detection) is proposed. This is one of magnetic domain enlargement and reproduction technologies used in a magneto-optical disk. For example, in Japanese Patent Application Laid-Open (JP-A) No. 6-290496, a technology relating to the DWDD system is disclosed.

FIG. 2 shows a partially enlarged sectional view of a magneto-optical disk disclosed in JP-A No. 6-290496. Reference numeral 71 denotes a substrate, reference numeral 72 denotes a dielectric layer, reference numeral 73 denotes a recording layer, and reference numeral 74 denotes a dielectric layer. Further, reference numeral 75 denotes a groove, and reference numeral 76 denotes a land.

The recording layer 73 is formed by sequentially laminating a first magnetic layer, a second magnetic layer, and a third magnetic layer. The first magnetic layer is consisted of a perpendicular magnetizing film having relatively smaller magnetic domain wall magnetic drag and larger magnetic domain wall mobility to the third magnetic layer at temperature close to ambient temperature, the second magnetic layer is consisted of a magnetic layer having lower Curie temperature than the first magnetic layer and the third magnetic layer, and the third magnetic layer is consisted of a perpendicular magnetizing film. Recording of data signals is performed by modulating the exterior magnetic field while applying a power laser beam that makes the third magnetic layer at equal to or more than Curie temperature with the medium being moved.

Further, JP-A Nos. 11-296910 and 2000-40259 propose pre-format by which recording density equal to the land and groove recording is achieved, depths of two grooves are suitably changed, the two grooves having different depths are arranged adjacently, and sufficient CTS signal amplitude and push-pull signal amplitude can be obtained even when the cutoff frequency is exceeded. This pre-format realizes stable tracking servo in a track pitch exceeding the cutoff frequency. In the pre-format, deep grooves and shallow grooves are adjacently arranged, and the interval of the deep grooves (or shallow grooves) is a track period (1.0 µm) and the interval of the deep groove and the shallow groove is a track pitch (0.5 µm). Two lands (track A, track B) on both ends of the shallow groove sandwiched by deep grooves are a recording area. Therefore, the track density in the pre-format is high density twice the conventional one, that is, equal to the recording density of the land and groove recording.

That is, the track density of the land and groove recording is about twice the conventional one, and, in the pre-format, the recording area is also two lands (track A, track B) on both ends of the shallow groove, and equal to the track density of the land and groove recording. Therefore, it has been difficult to make the track density into higher density equal to or more than twice the conventional one.

Further, in the land and groove recording, the groove width and the land width are substantially the same. When the groove width and the land width are substantially the same, the push-pull signal provides a sufficient signal amount at the maximum, however, the signal amount of the CTS signal becomes insufficient, as shown in FIG. 1. In a normal disk reproducing apparatus, for seek operation, about 6% to 7% is required for a signal amount of a signal for counting the number of tracks, and a signal amount of about 14% is required for a detection signal for tracking servo. Here, the signal amount is defined with a signal obtained on a surface on which no groove or pit is formed (so-called dummy surface) as 100%.

As described above, if the signal amount of the CTS signal is insufficient, at the time of seeking operation for moving toward a target address at high speed, there is a problem in seeking by the CTS signal because the number of traversed tracks can not be detected accurately from the CTS signal. Needless to add, it is impossible that tracking servo is applied with a CTS signal in a small signal amount.

Further, in order to obtain these push-pull signal and CTS signal having required signal amounts, the spatial frequency of the track pitch is needed to be made into about ½ to ⅔ of the cutoff frequency of the optical pickup of the reproducing apparatus. Here, the cutoff frequency refers to a frequency at which the reproduction signal amplitude becomes nearly zero, and is expressed by $2NA/\lambda$ assuming that the wavelength of a laser beam used for data reproduction is $\lambda$, and the numerical aperture of an objective lens is NA.

Therefore, an object of the invention is to provide an optical recording medium, a master for optical recording medium manufacture, a recording/reproducing apparatus, and a recording/reproducing method by which higher track density is realized, and, even when the groove width and the land width are substantially the same, the signal amounts of the push-pull signal and the CTS signal can be obtained sufficiently.

DISCLOSURE OF THE INVENTION

In order to solve the above-described problems, the invention of claim 1 is an optical recording medium having grooves formed along recording tracks and being applied with light having a predetermined wavelength $\lambda$ for performing recording and/or reproduction, and the medium is characterized in that, as the grooves, first and second grooves and a third groove shallower than the first and second grooves are formed so as to be arranged adjacently, and a signal is recorded to the first and second grooves and two lands between the first groove and the third groove and between the second groove and the third groove.

The invention of claim 6 is a master for optical recording medium manufacture used when manufacturing an optical recording medium having grooves formed along recording tracks and being applied with light having a predetermined wavelength $\lambda$ for performing recording and/or reproduction, and the master is characterized in that, as the grooves, first and second grooves and a third groove shallower than the first and second grooves are formed so as to be arranged adjacently, and a signal is recorded to the first and second grooves and two lands between the first groove and the third groove and between the second groove and the third groove.

The invention of claim 11 is a recording/reproducing apparatus for an optical recording medium having grooves formed along recording tracks and being applied with light having a predetermined wavelength $\lambda$ for performing recording and/or reproduction, and the apparatus is characterized in that, as the grooves, first and second grooves and a third groove shallower than the first and second grooves are formed so as to be arranged adjacently, and a signal is recorded to the first and second grooves and two lands between the first groove and the third groove and between the second groove and the third groove.

The invention of claim 14 is a recording/reproducing method for an optical recording medium having grooves formed along recording tracks and being applied with light having a predetermined wavelength $\lambda$ for performing recording and/or reproduction, and the method is characterized in that, as the grooves, first and second grooves and a third groove shallower than the first and second grooves are formed so as to be arranged adjacently, and a signal is recorded to the first and second grooves and two lands between the first groove and the third groove and between the second groove and the third groove.

In the invention, since the recording area is formed as total four tracks of the first and second grooves and the first and second lands, the track density can be made four times higher than the conventional one. Further, since the first and second grooves are formed as deep grooves and the third groove is formed as a shallow groove, by suitably setting the depths of these grooves, a push-pull signal amount and a CTS signal amount can be obtained sufficiently, stable tracking servo and seeking can be performed, and further, pre-format suitable for an optical recording medium having good recording and reproduction characteristics can be provided.

BRIEF DESCRIPTION OF THE DRAWINGS

FIG. 7 is a block diagram of an example of a recording/reproducing apparatus for performing recording/reproduction on the magneto-optical disk to which the invention is applied.

BEST MODE FOR CARRYING OUT THE INVENTION

Figure 1:
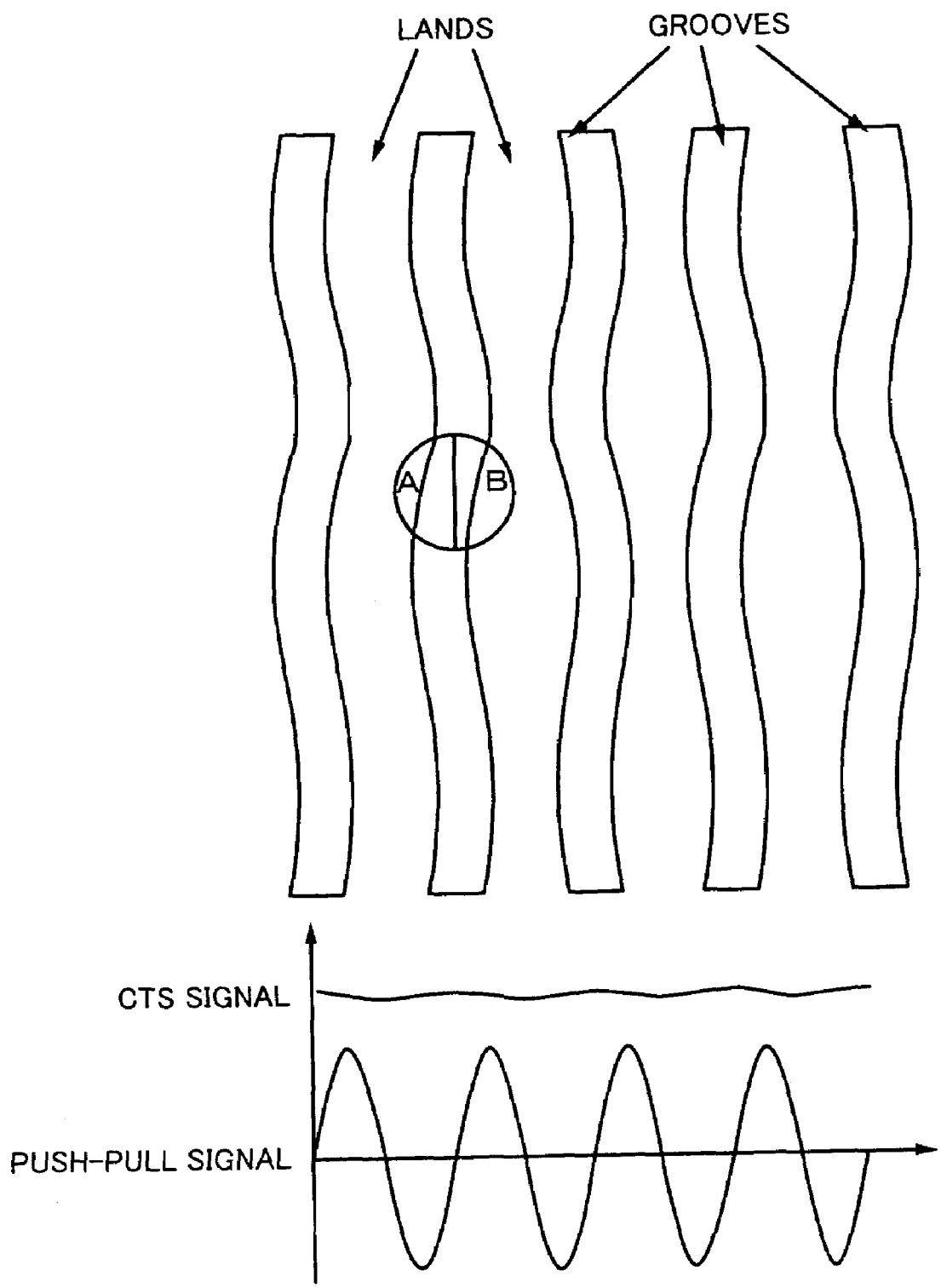
FIG. 1 is a diagram showing a part of a recording area, a waveform of a CTS signal, and a waveform of a push-pull signal of a conventional magneto-optical disk.
Figure 2:
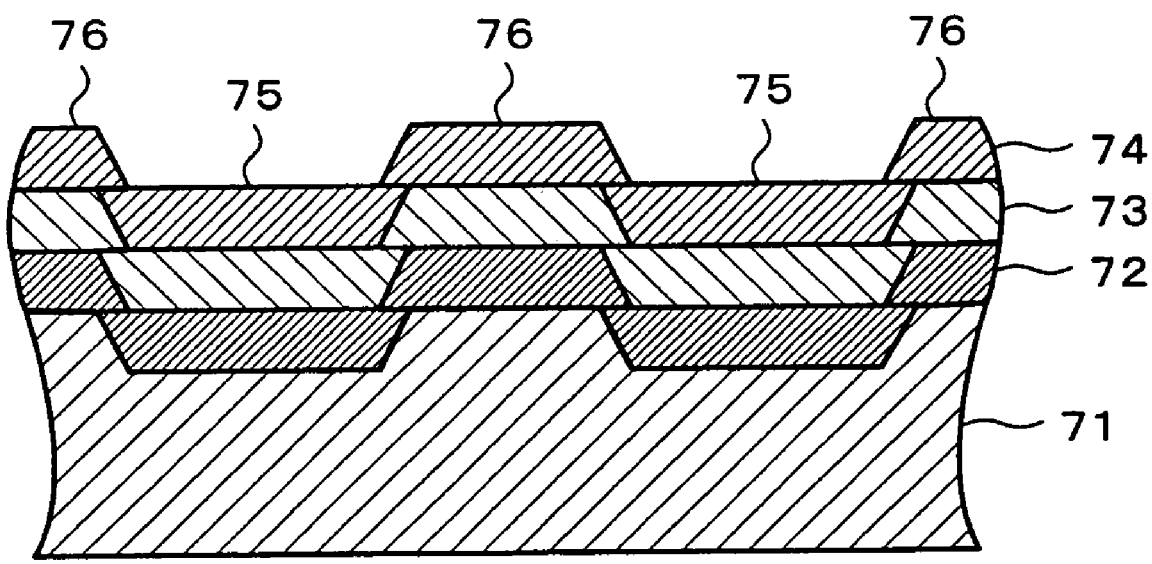
FIG. 2 is a partially sectional view used for explanation of a DWDD super resolution magneto-optical disk.
Figure 3A:
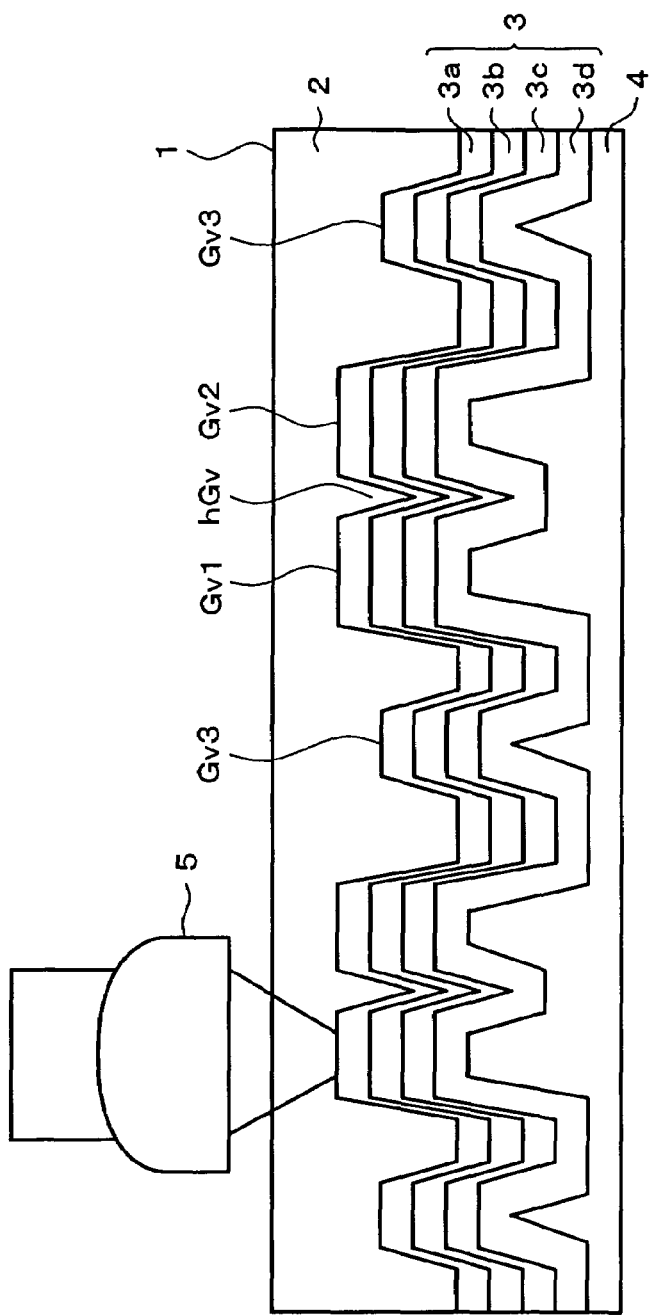
FIGS. 3A and 3B are sectional views of a magneto-optical disk to which the invention is applied, in which main parts thereof are enlarged.
Figure 3B:
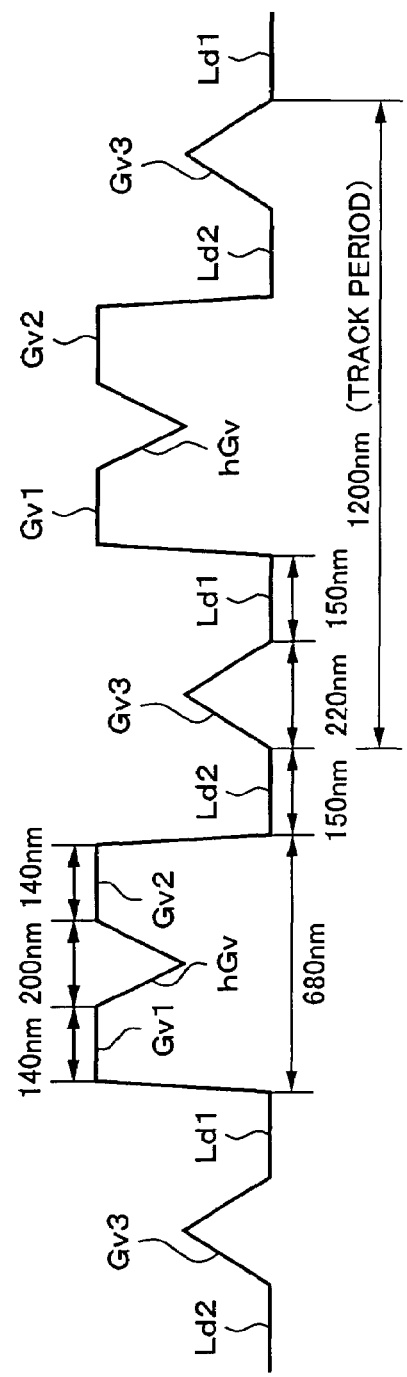
Figures 4A, 4B, 4C:
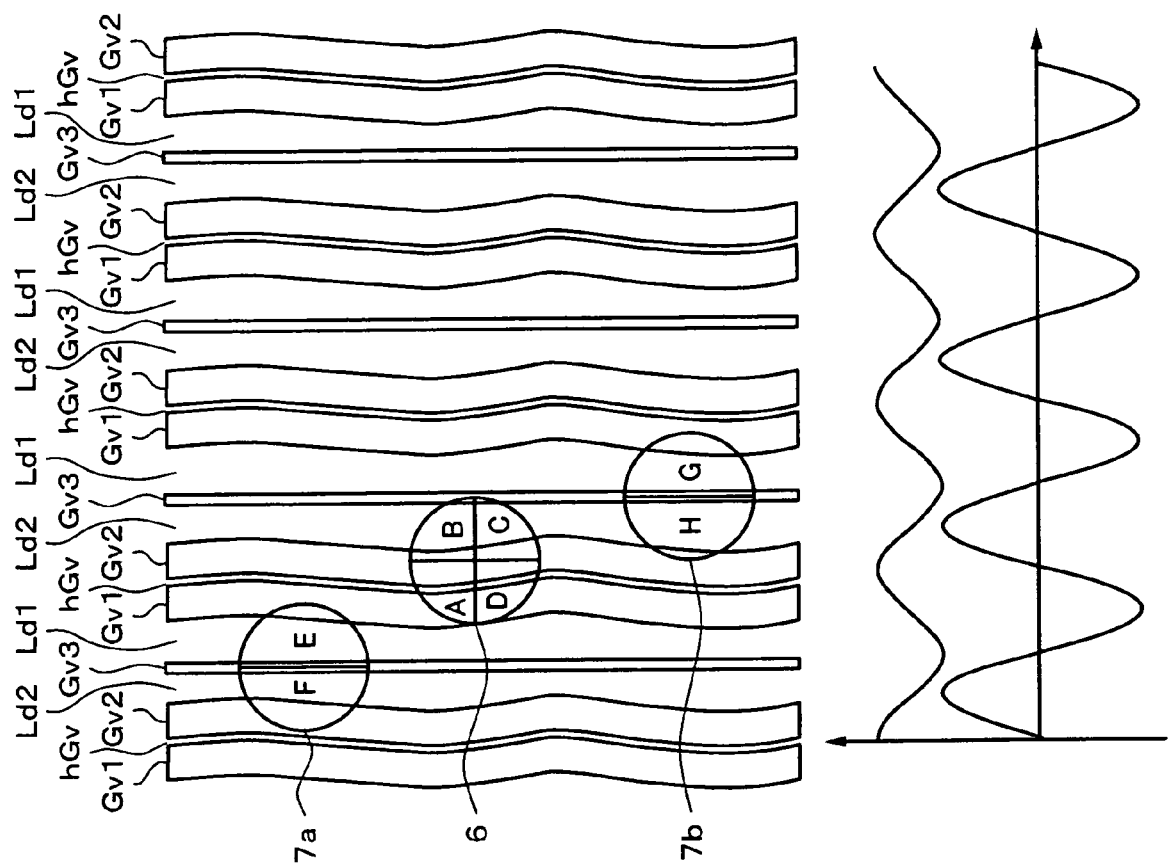
FIGS. 4A, 4B and 4C are diagrams showing a part of a recording area, a waveform of a CTS signal, and a waveform of a push-pull signal of the magneto-optical disk to which the invention is applied.

Hereinafter, embodiments of the invention will be described in detail by referring to the drawings. With respect to a magneto-optical disk to which the invention is applied, sectional views in which main parts thereof are enlarged are shown in FIGS. 3A and 3B. FIG. 3A shows a construction of the magneto-optical disk, and FIG. 3B shows an example of a specific recording track structure. FIGS. 4A to 4C are diagrams relating to a recording area of the magneto-optical disk. FIG. 4A is an enlarged view of a part of the recording area, FIG. 4B shows an output waveform of a CTS signal by a photo detector, and FIG. 4C is an output waveform of a push-pull signal by the photo detector.

Reference numeral 1 in FIG. 3A denotes a magneto-optical disk. The magneto-optical disk 1 is formed in a disc shape, and recording and reproduction of data are performed by utilizing the magneto-optical effect. Further, the magneto-optical disk 1 includes a recording layer 3 on which magneto-optical recording is performed and a protective layer 4 for protecting the recording layer 3 formed on a disk substrate 2 consisted of polymethyl methacrylate (PMMA), polycarbonate (PC), etc. Here, the recording layer 3 is formed by laminating, for example, a first dielectric film 3a consisted of silicon nitride ($Si_3N_4$) etc., a magnetic film 3b, a second dielectric film 3c consisted of silicon nitride ($Si_3N_4$) etc., and a reflective film 3d consisted of an Al—Ti alloy, etc. Further, the protective layer 4 is formed, for example, by being spin coated with an ultraviolet curable resin on the recording layer 3, and applied with ultraviolet light. The magnetic film 3b is formed by sequentially laminating a first magnetic layer (TbFeCo), a second magnetic layer (GdFe), and a third magnetic layer (GdFeCo). By the way, in the invention, the constitution of the recording layer 3 and the protective layer 4 is arbitrary, and not limited to this example.

In the magneto-optical disk 1, as shown in FIG. 4A by the enlarged view of a part of the recording area, grooves are formed in a convoluted form along the recording tracks, and recording and/or reproduction are/is performed by being applied with light having a predetermined wavelength λ by an optical pickup 5. As the grooves, a first groove Gv1, a second groove Gv2, and a third groove Gv3 are formed so as to be arranged adjacently.

The first groove Gv1 and the second groove Gv2 are deep grooves and the third groove Gv3 is a shallow groove. Hereinafter, suitably, the first groove Gv1 and the second groove Gv2 are referred to as "deep groove", and the third groove Gv3 is referred to as "shallow groove". Further, two grooves of the first groove Gv1 and the second groove Gv2 and two lands of a first land Ld1 between the first groove Gv1 and the third groove Gv3 and a second land Ld2 between the second groove Gv2 and the third groove Gv3 are arranged so that signals are recorded therein. That is, in the magneto-optical disk 1, four recording tracks of the first groove Gv1 and the second groove Gv2, and the first land Ld1 and the second land Ld2 are formed in a convoluted form. Note that a groove between the first groove Gv1 and the second groove Gv2 is referred to as a half groove hGv. The half groove hGv is formed by, for example, making the depth thereof shallower than that of the deep groove.

The four recording tracks are formed nearly in the same width. In the example shown in FIG. 3B, the first groove Gv1 and the second groove Gv2 are 140 nm, and the first land Ld1 and the second land Ld2 are 150 nm. That is, the widths of the two lands (the first land Ld1 and the second land Ld2) and the top widths (upper widths) of the deep grooves (the first groove Gv1 and the second groove Gv2) are formed nearly in the same width. Thus, by making the widths of the recording tracks nearly the same, recording and reproduction characteristics can be made better.

Further, in the example shown in FIG. 3B, a period of each of the four recording tracks is set to, for example, 1200 nm, the bottom width of the third groove Gv3, i.e., the width between the second land Ld2 and the first land Ld1 is set to, for example, 220 nm, and the width between the first land Ld1 and the second land Ld2 as a bottom of the two deep grooves is set to, for example, 680 nm. Further, the width of the half groove hGv between the top of the first groove Gv1 and the top of the second groove Gv2 is set to, for example, 200 nm.

Both or one of the deep groove and the shallow groove are/is a wobble groove formed so as to wind. In the example of FIG. 3, as shown in FIG. 4A, the first groove Gv1 and the second groove Gv2 as the deep grooves are wobble grooves. The amplitude of the wobble is set to, for example, ±15 nm.

By thus forming the four recording tracks, the track density of the magneto-optical disk 1 can be nearly four times that of the conventional one.

As shown in FIG. 4A, the magneto-optical disk 1 to which the invention is applied is reproduced with three beams. A center beam is located at the center of either one of the two adjacent deep grooves, and two side beams are aligned with the centers of the shallow grooves located on both sides of the two adjacent deep grooves. The reflected light of the center beam is detected by a four-part split photo detector 6, and the reflected light of the side beams is detected by two-part split photo detectors 7a and 7b.

The CTS signal shown in FIG. 4B is obtained from a sum signal (A+B+C+D) of the four-part split photo detector 6. Thus obtained CTS signal has the same period with the track period and a sufficient amplitude, and takes the maximum value in the central position between the two adjacent deep grooves (half groove hGv) and the minimum value in the central position of the shallow groove.

In the case where tracking servo is applied with the sum signal, a tracking error is obtained from the difference (E+F)−(G+H) between the respective sum signals of the two side beams 7a and 7b. The push-pull signal shown in FIG. 4C is obtained by calculating the sums (A+D) and (B+C) of detection signals of the respective two areas located on both sides relative to the track extension direction of the four-part split photo detector 6 and the difference (A+D)−(B+C) between these sum signals. Thus obtained push-pull signal has the same period with the track period and takes zero in the central position between the two adjacent deep grooves (half groove hGv) and the central position of the shallow track.

As described above, the locations where data is recorded are the first groove Gv1 and the second groove Gv2 and the first land Ld1 and the second land Ld2. When seeking in the first groove Gv1, for example, the position where the push-pull signal level is −75% and the CTS signal is increasing and larger than the medium value (average value) is sought. When seeking in the second groove Gv2, for example, the position where the push-pull signal level is +75% and the CTS signal is decreasing and larger than the medium value (average value) is sought.

Further, when seeking in the first land Ld1, for example, the position where the push-pull signal level is +75% and the CTS signal is decreasing and smaller than the medium value (average value) is sought. When seeking in the second land Ld2, for example, the position where the push-pull signal level is −75% and the CTS signal is increasing and smaller than the medium value (average value) is sought.

When the above-described magneto-optical disk 1 is manufactured, a master for magneto-optical medium manufacture as a master of the magneto-optical medium 1 is required to be fabricated, and a laser cutting device is used therefor. As below, an example of the laser cutting device used for fabrication of the master for magneto-optical medium manufacture will be described in detail by referring to FIG. 5.

The example of the laser cutting apparatus described here forms a concavo-convex pattern in which two deep grooves and one shallow groove are arranged alternately and radially at even intervals by splitting a laser beam output from a light source into a first exposure beam (for wobbled deep groove formation) and a second exposure beam (for shallow groove formation) by a beam splitter and a mirror, polarizing the first exposure beam for forming a wobble groove, further splitting the polarized first exposure beam into two exposure beams (an exposure beam 1-1 and an exposure beam 1-2) by a beam splitter and a mirror, disposing these split three beams radially at suitable intervals, and selecting each exposure power suitably.

Figure 5:
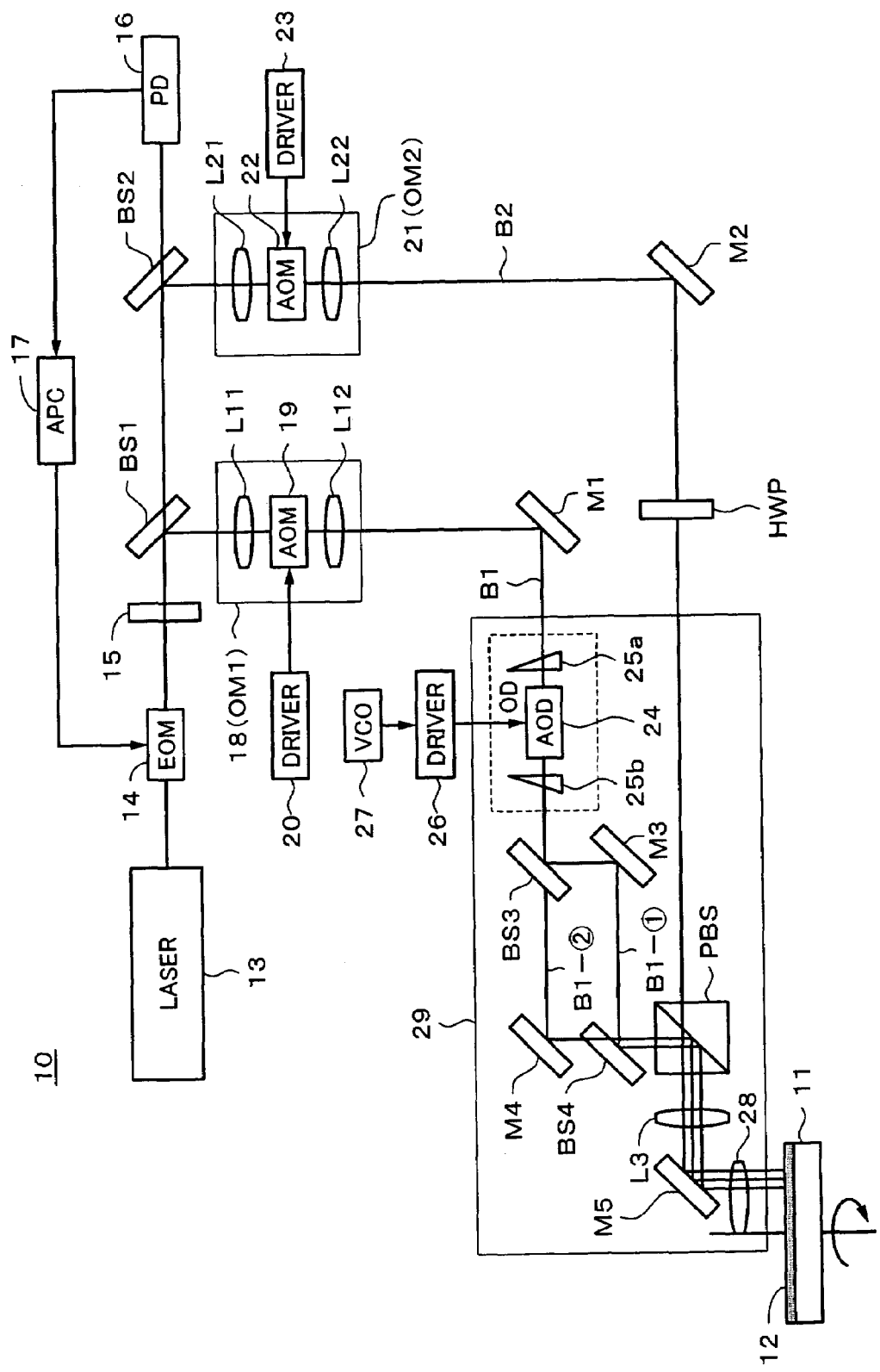
FIG. 5 is a diagram showing an outline of an optical system of an example of a laser cutting device used when fabricating an optical recording medium and a master for optical recording medium manufacture according to the invention.

A laser cutting device 10 shown in FIG. 5 is for exposing a photoresist 12 applied on a glass substrate 11 with light to form a latent image on the photoresist 12. When a latent image is formed on the photoresist 12 by the laser cutting device 10, the glass substrate 11 applied with the photoresist 12 is mounted on a rotationally driving unit provided on a moving optical table. When the photoresist 12 is exposed, the glass substrate 11 is rotationally driven by the rotationally driving unit and moved in parallel by the moving optical table so that the photoresist 12 may be exposed with light over the entire surface thereof in a desired pattern.

The laser cutting device 10 includes a light source 13 for outputting a laser beam, an electro optical modulator (EOM) 14 for adjusting light intensity of the laser beam output from the light source 13, an analyzer 15 disposed on an optical axis of the laser beam output from the electro optical modulator 14, a first beam splitter BS1 and a second beam splitter BS2 for splitting the laser beam transmitted through the analyzer 15 into reflected light and transmitted light, a photo detector (PD) 16 for detecting the laser beam transmitted through the second beam splitter BS2, a light output control unit (APC: auto power controller) 17 for applying a signal field to the electro optical modulator 14 and adjusting intensity of the laser beam output from the electro optical modulator 14.

The laser beam output from the light source 13 is, first, made to have predetermined light intensity by the electro optical modulator 14 that is driven by the signal field applied by the APC 17, and then, entered into the analyzer 15. Here, the analyzer 15 is an analyzer for transmitting S polarized light only, and the laser beam transmitted through the analyzer 15 becomes S polarized light.

Note that, for the light source 13, any one can be used, however, a light source that outputs a short-wavelength laser beam is preferable. Specifically, for example, a Kr laser for outputting a laser beam having a wavelength λ of 351 nm, a He—Cd laser for outputting a laser beam having a wavelength λ of 442 nm, and the like are suitable for the light source 13.

The light intensity of the laser beams transmitted through the beam splitters BS1 and BS2 is detected by the photo detector 16, and a signal according to the light intensity is sent from the photo detector 16 to the APC 17. Then, the APC 17 adjusts the signal field to be applied to the electro optical modulator 14 so that the light intensity detected by the photo detector 16 may be constant at a predetermined level. Thereby, feedback control is performed so that the light intensity output from the electro optical modulator 14 may be constant, whereby a stable laser beam with less noise is obtained.

The laser beam output from the light beam 13 is reflected by the beam splitter BS1, and the reflected light of the beam splitter BS1 is entered into an optical modulation system (shown by OM1 in FIG. 5) 18. A beam relay optical system and an AOM 19 provided in an intermediate position thereof are arranged so as to satisfy Bragg condition. The relay optical system is arranged so as to concentrate the laser beam output from the light source 13 onto the AOM 19 using a lens L11. The laser beam is intensity-modulated based on an ultrasonic wave supplied to the AOM 19. To the AOM 19, a drive signal is supplied from a driver 20.

The drive signal is a direct current signal in the case of groove formation. If a pit is formed, the modulated signal is a direct current signal. In response to the direct current signal, the laser beam is continuously modulated and an exposure beam B1 for deep groove formation is formed.

The laser beam intensity-modulated by the AOM 19 and diverging is made into a collimated beam by a lens L12. Then, the exposure beam B1 output from the optical modulation system 18 (OM1) is reflected by a mirror M1 and guided onto a moving optical table 29 horizontally and in parallel.

Furthermore, the laser beam output from the light source 13 is reflected by the beam splitter BS2, and the reflected light of the beam splitter BS2 is entered into an optical modulation system (shown by OM2 in FIG. 5) 21. A beam relay optical system (a lens L21 and a lens L22) and an AOM 22 provided in an intermediate position thereof are arranged so as to satisfy Bragg condition. The laser beam is intensity-modulated based on an ultrasonic wave supplied to the AOM 22. To the AOM 22, a drive signal is supplied from a driver 23. In response to a level of the direct current signal, the laser beam is continuously modulated and an exposure beam B2 for shallow groove formation is formed. The laser beam intensity-modulated by the AOM 22 and diverging is made into a collimated beam by the lens L22, reflected by a mirror M2, and entered into a polarizing beam splitter PBS via an HWP (half wavelength plate).

The laser beam (the exposure beam B1) reflected by the mirror M1 and guided horizontally onto the moving optical table 29 is optically deflected by an optical deflection system OD and entered into the beam splitter BS3 to be split into an exposure beam B1-1 for the first deep groove formation and an exposure beam B1-2 for the second deep groove formation. The exposure beam B1-1 is reflected by a mirror M3, and the exposure beam B1-2 is reflected by a mirror M4 and the traveling direction thereof is bent 90°. Then, the split two exposure beams (the exposure beam B1-1 and the exposure beam B1-2) are recombined by a beam splitter BS4, and then, entered into the polarizing beam splitter PBS.

The optical deflection system OD is for performing optical deflection on the laser beam so that it may correspond to the wobble of the deep groove. That is, the laser beam which is incident into the optical deflection system OD is entered into an acousto-optical deflector (AOD) 24 via a wedge prism 25*a*, and, by the acousto-optical deflector 24, optical deflection is performed so that it may correspond to the desired exposure pattern. Here, as an acousto-optical element used for the acousto-optical deflector 24, for example, an acousto-optical element consisting of tellurium oxide ($TeO_2$) is suitable. The laser beam optically deflected by the acousto-optical deflector 24 is output from the optical deflection system OD via a wedge prism 25*b*.

Note that the wedge prisms 25*a* and 25*b* are for allowing the laser beam to enter so as to satisfy the Bragg condition into the lattice plane of the acousto-optical element of the acousto-optical deflector 24 and changing the beam horizontal height by performing optical deflection on the laser beam by the acousto-optical deflector 24.

Here, to the acousto-optical deflector 24, a driving driver 26 for driving the acousto-optical deflector 24 is connected. To the driving driver 26, a direct current voltage and a signal formed by FM modulating a high frequency signal from a voltage controlled oscillator (VCO) 27 with a control signal including address information are supplied. Then, the acousto-optical deflector 24 is driven by the driving driver 26 in response to the signal, and thereby, the optical deflection is performed on the laser beam.

Specifically, for example, the address information is added to a groove by wobbling the groove with an FM modulation signal with the frequency of 84.672 kHz as a carrier. In this case, in order to create the phase grating of the acousto-optical deflector 24, for example, a signal formed by superposing the high frequency signal having a center frequency of 224 MHz on the FM modulated signal at frequency of 84.672 kHz is supplied from the voltage controlled oscillator 27 to the driving driver 26.

Then, in response to the signal, the acousto-optical deflector 24 is driven by the driving driver 26 and the Bragg angle of the acousto-optical element of the acousto-optical deflector 24 is changed, and thus, the light spot position of the laser beam collected on the photoresist 12 is vibrated at the frequency of 84.672 kHz in the amplitude of ±15 nm in the radial direction of the glass substrate 11.

Accordingly, by such an optical deflection system OD, the laser beam optically deflected so as to correspond to the wobble of the wobble groove is split into two of the exposure beam B1-1 and the exposure beam B1-2 by the beam splitter BS3, recombined by the mirror M3, the mirror M4 and the beam splitter BS4, and then, entered into the polarizing beam splitter PBS.

Here, the polarizing beam splitter PBS is arranged so as to reflect S polarized light and transmit P polarized light. Further, the exposure beam B1-1 optically deflected by the optical deflection system OD so as to wobble and the exposure beam B1-2 are S polarized light, and the exposure beam B2 entered into the polarizing beam splitter PBS via the HWP is P polarized light. Therefore, the exposure beam B1-1 and the exposure beam B1-2 are reflected by the polarizing beam splitter PBS, and the exposure beam B2 is transmitted through the polarizing beam splitter PBS. Thereby, the exposure beam B1-1, the exposure beam B1-2, and the exposure beam B2 are recombined so that the traveling directions thereof may be the same.

The exposure beam B1-1, the exposure beam B1-2, and the exposure beam B2 recombined so that the traveling directions thereof may be the same and output from the polarizing beam splitter PBS are made to have a predetermined beam diameter by a magnifying lens L3, and then, reflected by a mirror M5, guided to an objective lens 28, and concentrated onto the photoresist 12 by the object lens 28. Note that the exposure beam B1-1, the exposure beam B1-2, and the exposure beam B2 recombined so that the traveling directions thereof may be the same and output from the polarizing beam splitter PBS can be applied onto the photoresist 12 at suitable radial intervals by changing angles of the polarizing beam splitter PBS and the beam splitter BS4. Then, by making intensity of the laser beams adjustable to be different, recording areas by three laser beams arranged at suitable intervals can be formed.

The photoresist 12 is exposed with these three laser beams and latent images are formed on the photoresist 12. At this time, the glass substrate 11 applied with the photoresist 12 is rotationally driven by the rotationally driving unit so that the exposure may be performed over the entire surface of the photoresist 12 in a desired pattern and the laser beam is radially moved by the moving optical table. As a result, latent images according to the irradiation locus of the laser beam are formed over the entire surface of the photoresist 12.

Note that the objective lens 28 for concentrating the laser beam onto the photoresist 12 is preferably a lens having a larger numerical aperture NA for enabling formation of a finer groove pattern, and specifically, an objective lens having a numerical aperture NA on the order of 0.9 is suitable.

As an example, focal lengths of the concentrating lenses L11 and L21 of the optical modulation systems 18 and 20 are set to 80 mm, focal lengths of the collimating lenses L12 and L22 are set to 120 mm, a focal length of the magnifying lens L3 is set to 50 mm, respectively. In this case, with respect to the two deep grooves, the laser power is selected as 0.35 mj/m, and with respect to the shallow groove, the laser power is selected as 0.15 mj/m. In the case of the deep groove, since exposure is performed so as to penetrate the photoresist 12, change in depth of the deep groove is obtained as change in thickness of the photoresist 12. On the other hand, in the case of the shallow groove, since exposure is performed so as not to penetrate the photoresist 12, change in depth of the shallow groove is obtained as change in laser power. In consideration of this point, the depths of the two grooves are set to suitable ones.

Next, a method of manufacturing the magneto-optical disk 1 shown in FIGS. 3A and 3B will be described in detail by citing a specific example. In the manufacture of the magneto-optical disk 1, in a mastering process, first, manufacture of a glass master as a base of a master for magneto-optical medium manufacture is performed. In the manufacture of the glass master, first, the disk-shaped glass substrate 11 having a ground surface is cleaned and dried, and thereafter, the photoresist 12 as a photosensitive material is applied onto this glass substrate 11. Next, the photoresist 12 is exposed with light by the above-described laser cutting device 10, and latent images corresponding to the three kinds of grooves are formed on the photoresist 12.

After the latent images are formed on the photoresist 12, the glass substrate 11 is placed on a turning table of a developing unit with the surface on which the photoresist 12 is applied facing upward. Then, while rotating the glass substrate 11 by rotating the turning table, development processing is performed by dropping developer on the photoresist 12 to form a concavo-convex pattern corresponding to the respective two deep grooves and the shallow groove on the glass substrate 11.

Next, a conducting film consisted of nickel etc. is formed on the concavo-convex pattern by electroless plating, and then, the glass substrate 11 on which the conducting film has been formed is mounted on an electroforming apparatus to form a nickel plating layer having a thickness on the order of 300±5 [μm] on the conducting film by electroplating. Subsequently, this plating layer is peeled, the peeled plating is cleaned using acetone etc., and the photoresist 12 remaining on the surface on which the concavo-convex pattern is transferred is eliminated.

By the above-described processes, the master for optical recording medium manufacture having plating thereon formed by transferring the concavo-convex pattern that has been formed on the glass substrate 11, i.e., the master (so-called stamper) for optical recording medium manufacture on which the concavo-convex pattern respectively corresponding to the deep grooves and the shallow groove is completed.

Next, as a transfer process, a disk substrate shaped by transferring the surface shape of the master for optical recording medium manufacture thereon is fabricated using the photo polymerization method (so-called 2P method). Specifically, first, a photopolymer is applied smoothly onto the surface on which the concavo-convex pattern of the master for optical recording medium manufacture has been formed to form a photopolymer layer, and then, while preventing bubbles and dirt from entering the photopolymer layer, a base plate is allowed to adhere to the photopolymer layer. Here, for the base plate, for example, a base plate consisted of polymethyl methacrylate (refractive index 1.49) in thickness of 1.2 mm is used.

Subsequently, the photopolymer is cured by applying ultraviolet light, and then, by separating the master for optical recording medium manufacture, a disk substrate 2 shaped by transferring the surface shape of the master for optical recording medium manufacture thereon is fabricated.

Note that, here, there has been described the example of fabricating the disk substrate 2 using the 2P method in order to make the concavo-convex pattern formed on the master for optical recording medium manufacture to be transferred onto the disk substrate 2 more precisely. However, in the case of mass production of the disk substrate 2, needless to add, the disk substrate 2 may be fabricated by injection molding using a transparent resin such as polymethyl methacrylate and polycarbonate.

Next, as a film forming process, a recording layer 3 and a protective layer 4 are formed on the disk substrate 2 shaped by transferring the surface shape of the master for optical recording medium manufacture thereon. Specifically, for example, first, on the surface of the disk substrate 2 having the concavo-convex pattern formed thereon, films are formed using a sputtering device and the like in the order of a first dielectric film 3a consisted of silicon nitride ($Si_3N_4$) etc., a magnetic layer 3b as a magneto-optical recording layer consisted of terbium iron cobalt (TbFeCo) etc., a second dielectric film 3c consisted of silicon nitride ($Si_3N_4$) etc., and a light reflective film 3d consisted of an aluminum alloy (for example, Al—Ti) etc.

As a result, the recording layer 3 constituted by the first dielectric layer 3a, the magnetic layer 3b, the second dielectric layer 3c, and the light reflective layer 3d is formed. Subsequently, an ultraviolet curable resin is applied onto the recording layer 3 smoothly by the spin coating method and the like so as to cover the nearly entire surface of the substrate, and the ultraviolet curable resin is cured by applying ultraviolet light to form the protective layer 4. By the above-described processes, the magneto-optical disk 1 is completed.

Next, results of fabricating plural magneto-optical disks for evaluation by the above-described manufacturing method (2P method) or injection molding, and evaluating them will be described. The evaluation operation is performed using an MD evaluation machine including an optical pickup (wavelength λ=650 nm, NA=0.52).

In the evaluation operation, even if the two land widths of the land Ld1 and the land Ld2 and the two deep groove top widths of the groove Gv1 and the groove Gv2 are substantially the same, the deep groove and the shallow groove are provided as grooves and the depths of the deep groove and the shallow groove are suitably selected, and thereby, whether tracking servo can be applied by a push-pull signal or a CTS signal is evaluated. In the magneto-optical disk as in the embodiment, recording and reproduction characteristics of four recording tracks and wobble reproduction characteristics of the wobble grooves are evaluated.

In the case where the groove top widths and the land widths are the same, whether a push-pull signal or a CTS signal in a signal amount capable of applying tracking servo (for example, equal to or more than 14%) is obtained to the depths of the deep grooves and the depth of the shallow groove is evaluated. The evaluation values in Table 1 through Table 6 are on an evaluation disk having the structure shown in FIG. 3.

Further, in the tables, λ/xn represents a depth of a groove, and λ is a wavelength of a laser beam, for example, 650 nm, n represents a refractive index of a disk substrate from a light entrance surface to a groove, for example, 1.58, and x represents a coefficient. The value of x is changed. By the value of x, the groove width (nm) is defined. For example, for x=8, 650 nm/(8×1.58)=650 nm/12.64=51 nm. Note that, here, both a coefficient x of a deep groove and a coefficient y of a shallow groove are set to the groove depth coefficient x.

The following table 1 shows amplitude changes of the push-pull signal and the CTS signal when changing the depth between the two deep grooves (half groove hGv), in the case where the value of the coefficient x of the two deep grooves is set as x=2.9, that is, the groove depth is set to 142 nm (fractional portion of the number is rounded off) and the value of the coefficient x of the shallow groove is set as x=16. As the evaluation disk, one evaluation disk is manufactured corresponding to each depth of the shallow groove and the half groove hGv. Alternatively, an evaluation disk in which the depths of the shallow groove and the half groove hGv change sequentially thereon is manufactured.

TABLE 1

| Deep Groove | x = 2.9 | | | λ/xn = 142 nm |
|---|---|---|---|---|
| Shallow Groove | x = 16 | | | λ/xn = 26 nm |
| Half Groove | x | 0 | 16 | 8 | 3.1 |
| | nm | 0 | 26 | 51 | 133 |
| Push-pull (%) | | 35.5 | 13.8 | | 24.7 |
| CTS (%) | | 15.2 | 18.9 | | 19.6 |
| Shallow Groove | | | | |
| Half Groove | x | | | | |
| | nm | | | | |
| Push-pull (%) | | | | | |
| CTS (%) | | | | | |
| Shallow Groove | | | | |
| Half Groove | x | | | | |
| | nm | | | | |
| Push-pull (%) | | | | | |
| CTS (%) | | | | | |
| Shallow Groove | | | | |
| Half Groove | x | | | | |
| | nm | | | | |
| Push-pull (%) | | | | | |
| CTS (%) | | | | | |

The following table 2 shows amplitude changes of the push-pull signal and the CTS signal when changing the depth of the half groove hGv, in the case where the value of the coefficient x of the two deep grooves is set as x=2.7, that is, the groove depth is set to 152 nm (fractional portion of the number is rounded off) and the value of the coefficient x of the shallow groove is set as x=16, x=8, and x=6.

TABLE 2

| Deep Groove | x = 2.7 | | | λ/xn = 152 nm |
|---|---|---|---|---|
| Shallow Groove | x = 16 | | | λ/xn = 26 nm |
| Half Groove | x | 0 | 16 | 8 | 2.9 |
| | nm | 0 | 26 | 51 | 142 |
| Push-pull (%) | | 11.2 | 23.2 | | 30.8 |
| CTS (%) | | 15.2 | 21.9 | | 20.2 |
| Shallow Groove | x = 8 | | | λ/xn = 51 nm |
| Half Groove | x | 0 | 16 | 8 | 2.9 |
| | nm | 0 | 26 | 51 | 142 |
| Push-pull (%) | | 39.1 | 17.6 | | 30.8 |
| CTS (%) | | 4.6 | 15.4 | | 20.2 |
| Shallow Groove | x = 6 | | | λ/xn = 69 nm |
| Half Groove | x | 0 | 16 | 8 | 2.9 |
| | nm | 0 | 26 | 51 | 142 |
| Push-pull (%) | | 34.3 | 13.8 | | 22.0 |
| CTS (%) | | −0.6 | 10.2 | | 8.5 |
| Shallow Groove | | | | |
| Half Groove | x | | | | |
| | nm | | | | |
| Push-pull (%) | | | | | |
| CTS (%) | | | | | |

The following table 3 shows amplitude changes of the push-pull signal and the CTS signal when changing the depth of the half groove hGv, in the case where the value of the coefficient x of the two deep grooves is set as x=2.5, that is, the groove depth is set to 165 nm (fractional portion of the number is rounded off) and the value of the coefficient x of the shallow groove is set as x=16, x=6, and x=3.5.

TABLE 3

| Deep Groove | x = 2.5 | | | λ/xn = 165 nm | |
|---|---|---|---|---|---|
| Shallow Groove | x = 16 | | | λ/xn = 26 nm | |
| Half Groove | x | 0 | 16 | 8 | 2.7 |
| | nm | 0 | 26 | 51 | 152 |
| Push-pull (%) | | 46.9 | 28.9 | | 33.6 |
| CTS (%) | | 6.8 | 24.4 | | 21.3 |
| Shallow Groove | x = 6 | | | λ/xn = 69 nm | |
| Half Groove | x | 0 | 16 | 8 | 2.7 |
| | nm | 0 | 26 | 51 | 152 |
| Push-pull (%) | | 40.9 | 21.7 | | 27.1 |
| CTS (%) | | −5.9 | 11.8 | | 8.6 |
| Shallow Groove | x = 3.5 | | | λ/xn = 118 nm | |
| Half Groove | x | 0 | 16 | 8 | 2.7 |
| | nm | 0 | 26 | 51 | 152 |
| Push-pull (%) | | 24.3 | 13.4 | | 16.4 |
| CTS (%) | | −17.4 | −0.4 | | −2.8 |
| Shallow Groove | | | | | |
| Half Groove | x | | | | |
| | nm | | | | |
| Push-pull (%) | | | | | |
| CTS (%) | | | | | |

The following table 4 shows amplitude changes of the push-pull signal and the CTS signal when changing the depth of the half groove hGv, in the case where the value of the coefficient x of the two deep grooves is set as x=2.3, that is, the groove depth is set to 179 nm (fractional portion of the number is rounded off) and the value of the coefficient x of the shallow groove is set as x=16, x=8, x=6, x=4, x=3.2, and x=3.

TABLE 4

| Deep Groove | x = 2.3 | | | λ/xn = 179 nm | | | |
|---|---|---|---|---|---|---|---|
| Shallow Groove | x = 16 | | | λ/xn = 26 nm | | | |
| Half Groove | x | 0 | 16 | 8 | | 3 | 2.5 |
| | nm | 0 | 26 | 51 | | 137 | 165 |
| Push-pull (%) | | 43.2 | 29.4 | 27.8 | | 37.6 | 31.2 |
| CTS (%) | | 2.3 | 16.5 | 25.9 | | 20.3 | 22.4 |
| Shallow Groove | x = 8 | | | λ/xn = 51 nm | | | |
| Half Groove | x | 0 | 16 | 8 | 5 | 4 | 3 | 2.5 |
| | nm | 0 | 26 | 51 | 82 | 103 | 137 | 165 |
| Push-pull (%) | | 45.2 | 31.6 | 27.2 | 36.0 | 40.6 | 36.5 | 31.1 |
| CTS (%) | | −5.2 | 9.0 | 18.3 | 15.1 | 11.8 | 12.7 | 14.9 |
| Shallow Groove | x = 6 | | | λ/xn = 69 nm | | | |
| Half Groove | x | 0 | 16 | 8 | 5 | 4 | 3 | 2.5 |
| | nm | 0 | 26 | 51 | | 103 | 137 | 165 |
| Push-pull (%) | | 42.6 | 30.0 | 24.9 | | 36.2 | 33.1 | 28.6 |
| CTS (%) | | −11.2 | 3.0 | 12.4 | | 5.7 | 6.8 | 9.0 |

TABLE 4-continued

| Shallow Groove | x = 4 | | | λ/xn = 103 nm | |
|---|---|---|---|---|---|
| Half Groove | x | 0 | 16 | 8 | | 3 | 2.5 |
| | nm | 0 | 26 | 51 | | 137 | 165 |
| Push-pull (%) | | 31.0 | 21.9 | 18.1 | | 24.0 | 20.8 |
| CTS (%) | | −21.2 | −6.9 | 2.5 | | −3.2 | −1.0 |
| Shallow Groove | x = 3.2 | | | λ/xn = 129 nm | |
| Half Groove | x | 0 | 16 | 8 | | 3 | 2.5 |
| | nm | 0 | 26 | 51 | | 137 | 165 |
| Push-pull (%) | | 22.0 | 15.1 | 13.6 | | 18.4 | 15.4 |
| CTS (%) | | −24.5 | −10.3 | −0.9 | | −6.6 | −4.3 |
| Shallow Groove | x = 3 | | | λ/xn = 137 nm | |
| Half Groove | x | 0 | 16 | 8 | | 3 | 2.5 |
| | nm | 0 | 26 | 51 | | 137 | 165 |
| Push-pull (%) | | 19.6 | 13.1 | 12.5 | | 17.1 | 14.1 |
| CTS (%) | | −24.7 | −10.5 | −1.2 | | −6.8 | −4.6 |

The following table 5 shows amplitude changes of the push-pull signal and the CTS signal when changing the depth of the half groove hGv, in the case where the value of the coefficient x of the two deep grooves is set as x=2.1, that is, the groove depth is set to 196 nm (fractional portion of the number is rounded off) and the value of the coefficient x of the shallow groove is set as x=16, x=8, x=4, and x=3.7.

TABLE 5

| Deep Groove | x = 2.1 | | | λ/xn = 196 nm | |
|---|---|---|---|---|---|
| Shallow Groove | x = 16 | | | λ/xn = 26 nm | |
| Half Groove | x | 0 | | 8 | 2.3 |
| | nm | 0 | | 51 | 179 |
| Push-pull (%) | | 29.0 | | 15.9 | 21.3 |
| CTS (%) | | −0.6 | | 25.2 | 23.5 |
| Shallow Groove | x = 8 | | | λ/xn = 51 nm | |
| Half Groove | x | 0 | | 8 | 2.3 |
| | nm | 0 | | 51 | 179 |
| Push-pull (%) | | 35.9 | | 20.0 | 24.7 |
| CTS (%) | | −8.4 | | 17.4 | 15.9 |
| Shallow Groove | x = 6 | | | λ/xn = 103 nm | |
| Half Groove | x | | 16 | 8 | 2.3 |
| | nm | | 26 | 51 | 179 |
| Push-pull (%) | | | 18.4 | 15.2 | 18.3 |
| CTS (%) | | | −13.5 | 0.4 | −1.0 |
| Shallow Groove | x = 3.7 | | | λ/xn = 111 nm | |
| Half Groove | x | 0 | 16 | 8 | 3 | 2.3 |
| | nm | 0 | 26 | 51 | 137 | 179 |
| Push-pull (%) | | 24.1 | 16.0 | 13.4 | 21.0 | 16.2 |
| CTS (%) | | −27.1 | 15.2 | −1.4 | −4.9 | −2.7 |

The following table 6 shows amplitude changes of the push-pull signal and the CTS signal when changing the depth of the half groove hGv, in the case where the value of the coefficient x of the two deep grooves is set as x=2, that is, the groove depth is set to 206 nm (fractional portion of the number is rounded off) and the value of the coefficient x of the shallow groove is set as x=6 and x=5.

TABLE 6

| Deep Groove | x = 2 | | $\lambda/xn$ = 206 nm | |
|---|---|---|---|---|
| Shallow Groove | x = 6 | | $\lambda/xn$ = 69 nm | |
| Half Groove | x | 0 | 8 | 2.2 |
| | nm | 0 | 51 | 187 |
| Push-pull (%) | | 28.6 | 13.6 | 19.0 |
| CTS (%) | | -14.8 | 9.7 | 10.1 |
| Shallow Groove | x = 5 | | $\lambda/xn$ = 82 nm | |
| Half Groove | x | 0 | 8 | 2.2 |
| | nm | 0 | 51 | 187 |
| Push-pull (%) | | 27.6 | 13.4 | 18.2 |
| CTS (%) | | -19.8 | 4.7 | 5.2 |
| Shallow Groove | | | | |
| Half Groove | x | | | |
| | nm | | | |
| Push-pull (%) | | | | |
| CTS (%) | | | | |
| Shallow Groove | | | | |
| Half Groove | x | | | |
| | nm | | | |
| Push-pull (%) | | | | |
| CTS (%) | | | | |

In these tables 1 to 6, in the ranges surrounded by heavy lines, in the depths of the deep groove and the shallow groove corresponding to the ranges, the signal amount (absolute value) of the push-pull signal and CTS signal is equal to or more than 14%, and thereby, stable tracking servo can be performed.

Figure 6:
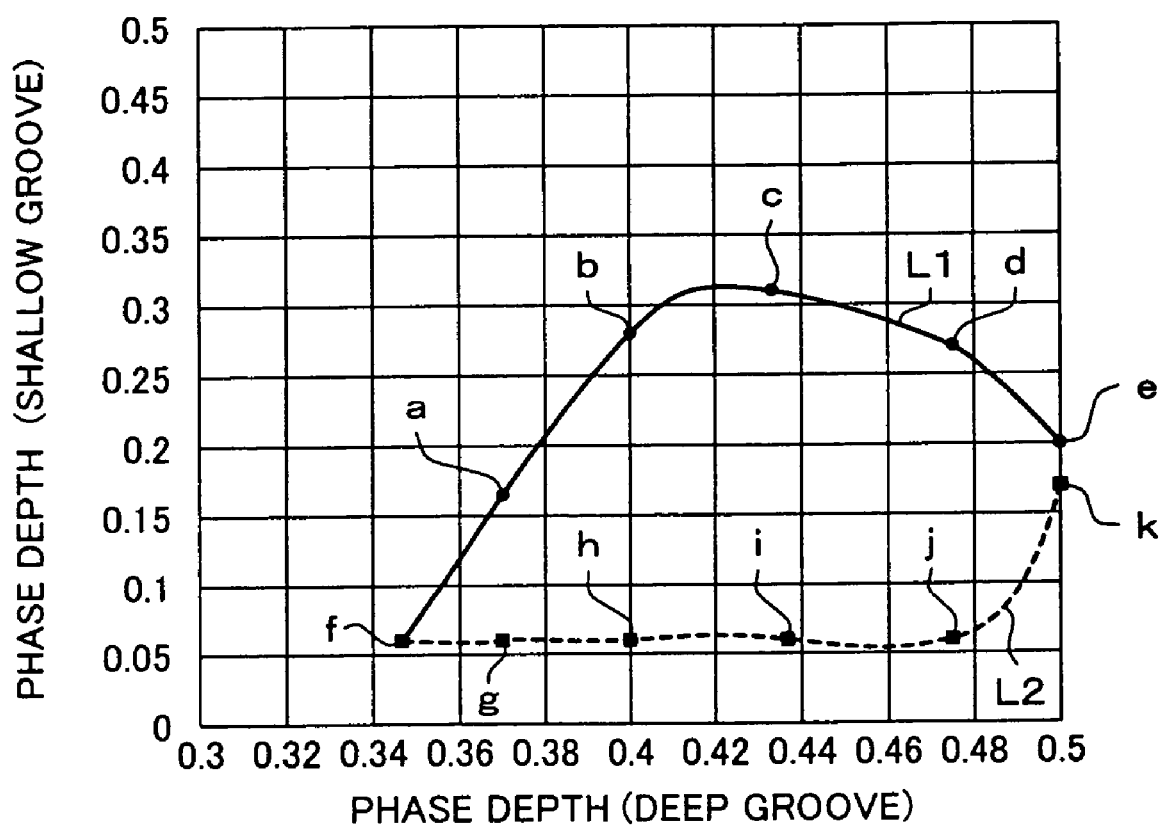
FIG. 6 is a diagram showing the relationship between a depth of a deep groove and a depth of a shallow groove in a condition in which a push-pull signal amount is equal to or more than 14%.

FIG. 6 shows a phase depth relationship between the shallow groove and the deep groove in a condition in which the signal amount of the push-pull signal is equal to or more than 14% (in the range of the heavy line). The longitudinal axis in FIG. 6 represents the phase depth Y of the shallow groove, and the lateral axis represents the phase depth X of the deep groove. For example, Xa in coordinates (Xa, Ya) of a point a is obtained as 0.370 . . . by an inverse number of the coefficient x of the deep groove shown in Table 2, i.e., by "1/2.7", and Ya is obtained as 0.166 . . . by an inverse number of the coefficient x of the shallow groove (upper limit value) shown in Table 2, i.e., by "1/6". Further, for example, Xg in coordinates (Xg, Yg) of a point g is obtained as 0.370 . . . by an inverse number of the coefficient x of the deep groove shown in Table 2, i.e., by "1/2.7", and Yg is obtained as 0.0625 by an inverse number of the coefficient x of the shallow groove (lower limit value) shown in Table 2, i.e., by "1/16".

Therefore, the points a to f in FIG. 6 are upper limit values of the groove depth providing the push-pull signal amount equal to or more than 14%, and the points f to k are lower limit values of the groove depth providing the push-pull signal amount equal to or more than 14%. That is, it is known that, within the range surrounded by the points a to k, the signal amount of the push-pull signal is equal to or more than 14% and stable tracking servo can be performed.

Here, an approximated curve L1 connecting the point a to point e is expressed by the following expression (1), an approximated curve L2 connecting the point f to point k is expressed by the following expression (2).

$$Y=-55081.936X^5+117717.139X^4-100176.653X^3+ 42397.950X^2-8916.164X+744.865 \qquad (1)$$

$$Y=33350.00X^5-67572.804X^4+54585.538X^3- 21975.309X^2+4409.171X-352.671 \qquad (2)$$

Therefore, the area surrounded by the points a to k can be expressed by approximation as an area that satisfies the following expression (3) and expression (4).

$$Y \leq -55081.936X^5+117717.139X^4-100176.653X^3+ 42397.950X^2-8916.164X+744.865 \qquad (3)$$

$$Y \geq 33350.000X^5-67572.804X^4+54585.538X^3- 21975.309X^2+4409.171X-352.671 \qquad (4)$$

That is, by forming the phase depth of the shallow groove and the phase depth of the deep groove so as to satisfy the above expressions (3) and (4), the signal amount of the push-pull signal becomes equal to or more than 14%, and thereby, stable tracking servo can be performed.

Further, in order to evaluate whether recording and reproduction characteristics are good, magneto-optical recording and reproduction are performed in all recording areas of the four recording tracks of the two deep grooves and the first land Ld1 and the second land Ld2 having suitable depths that provide the signal amount of the push-pull signal equal to or more than 14%. The jitter value at that time is on the order of 10%, and it is known that good recording and reproduction characteristics can be obtained.

In all of the portions of the deep (wobble) grooves having the wobble amplitude of ±15 nm and the non-wobbled shallow (DC) groove, the wobble signal can be reproduced.

In addition, since the wavelength $\lambda$ of the laser beam is 650 nm and the numerical aperture NA of the objective lens is 0.52, the cutoff frequency $2NA/\lambda$ of the optical pickup is 1600 (number/mm). On the other hand, when the distance between the first groove Gv1 and the second groove Gv2 is set as the track pitch the track pitch is 340 nm, and thereby, the evaluation optical disk has spatial frequency about 2941 (number/mm). Therefore, it is known that, in an optical disk having a track pitch of the spatial frequency higher than the cutoff frequency of the optical pickup, the push-pull signal and the CTS signal at sufficient levels can be obtained, and stable tracking servo and seeking can be performed.

FIG. 7 shows a constitution example of a recording/reproducing apparatus using the above-described magneto-optical disk. In FIG. 7, the reference numeral 51 denotes the magneto-optical disk in which two deep grooves and one shallow groove are alternately formed as described above. To an input terminal 52, data to be recorded is supplied. A data modulator 53 performs digital modulation on the input data. For example, the input data is modulated by RLL(1,7). In RLL(1,7), the shortest mark length is 2 T and the longest mark length is 8 T.

The output data of the data modulator 53 is supplied to a recording head drive unit 54. The recording head drive unit 54 supplies the modulated data to a recording head included in an recording/reproducing unit 55. The recording/reproducing unit 55 includes an optical pickup. At the time of recording, the optical pickup applies a laser beam for recording to the magneto-optical disk 51 to record the data.

Further, the optical pickup generates a wobble signal including a tracking error signal, a focus error signal, and address information from reflected light by the magneto-optical disk 51. The tracking error signal is formed from the push-pull signal or the CTS signal. The tracking error signal and the focus error signal from the recording/reproducing unit 55 are output to a servo unit 56. The servo unit 56 generates a control signal for controlling the tracking and focusing of the optical pickup within the recording/reproducing unit 55, a control signal for controlling the rotation of the magneto-optical disk 31, and a control signal for controlling the movement of the optical pickup in the disk radial direction.

The wobble signal is output to a wobble signal detection unit 57. The wobble signal detection unit 57 demodulates the address information from the wobble signal and outputs the address information to an address decoder 58. Further, the wobble signal detection unit 57 extracts a sinusoidal carrier signal from the wobble signal and supplies the extracted carrier signal to the servo unit 56.

The address decoder 58 calculates an address from an address information signal supplied from the wobble signal detection unit 57, and outputs the address to a system controller 59. The system controller 59 is arranged so as to output a predetermined control signal to the servo unit 56 according to the address information supplied from the address decoder 58, and, when a signal corresponding to a predetermined operation is supplied from an input device 60, output a control signal corresponding to the operation to the servo unit 56 to control the recording/reproducing unit 55.

The reproduction data that has been read out by the optical pickup of the magneto-optical disk 51 and obtained by the processing in the recording/reproducing unit 55 is supplied to a data demodulator 61. In the data demodulator 61, demodulation processing of the digital modulation performed at the time of recording, for example, RLL(1,7) is performed. The reproduction data is taken out from an output terminal 62 of the data demodulator 61.

In the magneto-optical disk 1 according to the above-described one embodiment, track density can be made four times higher than the conventional one, stable tracking servo and seeking can be performed, recording and reproduction characteristics of the total four recording tracks of two deep grooves and two lands are good, and the wobble reproduction characteristics are also good. Further, the laser cutting device 10 can be used for forming the above-described magneto-optical disk 1, and, in the recording/reproducing apparatus described by referring to FIG. 7, recording or reproduction of the above-described magneto-optical disk 1 can be performed.

This invention is not limited to the above-described one embodiment of the invention, but various modifications and applications can be made within the range not departing from the content of the invention. The invention can be widely applied to an optical recording medium having grooves formed along recording tracks and a master for optical recording medium manufacture used for its manufacture. The optical recording medium as a target of the invention may be, for example, any one of an optical recording medium exclusive to reproduction, an optical recording medium capable of repeated rewriting of data, or an optical recording medium capable of data recording, but incapable of deletion.

In addition, the data recording method is not specifically limited, and the optical recording medium as a target of the invention may be, for example, any one of an optical recording medium exclusive to reproduction in which data has been written in advance, a magneto-optical disk for performing recording and reproduction of data utilizing the magneto-optical effect or a phase change optical recording medium for performing recording and reproduction of data utilizing phase change of the recording layer.

Further, the invention can widely be applied to an optical recording medium having grooves formed in at least a part of a recording area thereof and a master for optical recording medium manufacture used for its manufacture. That is, for example, grooves may be formed on the entire recording area, or area in which grooves are not formed and data is recorded by emboss pits may exist within the recording area.

As described above in detail, according to the invention, since the recording area is formed as total four tracks of the first and second grooves and the first and second lands, higher track density can be realized. Further, since the first and second grooves are formed as deep grooves and the third groove is formed as a shallow groove, by suitably setting the depths of these grooves, an optical recording medium having good recording and reproduction characteristics in which signal amounts of a push-pull signal and a CTS signal can be obtained sufficiently, and stable tracking servo and seeking can be performed, a master for optical recording medium manufacture by which such optical recording medium can be manufactured, and a recording/reproducing apparatus for performing recording/reproduction on such optical recording medium can be provided.

The invention claimed is:

1. An optical recording medium having grooves formed along recording tracks and being applied with light having a predetermined wavelength $\lambda$ for performing recording and/or reproduction, the medium characterized in that,
   as the grooves, first and second grooves and a third groove shallower than the first and second grooves are formed so as to be arranged adjacently, and
   a signal is recorded to the first and second grooves and two lands between the first groove and the third groove and between the second groove and the third groove.

2. The optical recording medium according to claim 1, characterized in that at least one of the first and second grooves and the third groove is a wobble groove formed so as to wind.

3. The optical recording medium according to claim 1, characterized in that, assuming that a numerical aperture of an objective lens used for recording and/or reproduction is NA and a wavelength of light is $\lambda$, a spatial frequency of a track pitch is higher than a cutoff frequency expressed by $2 \times NA/\lambda$.

4. The optical recording medium according to claim 1, characterized in that a width of each of the two lands and a top width of the first and second grooves are substantially the same.

5. The optical recording medium according to claim 1, characterized in that, assuming that a refractive index of a medium from a light entrance surface to the grooves is n, a depth coefficient of the first and second grooves is x, $x \times n/\lambda$ is a phase depth X of the first and second grooves, a depth coefficient of the third groove is y, and $y \times n/\lambda$ is a phase depth Y of the third groove, the depth coefficient x of the first and second grooves and the depth coefficient y of the third groove satisfy the following expressions (5) and (6)

$$Y \leq -55081.936X^5 + 117717.139X^4 - 100176.653X^3 + 42397.950X^2 - 8916.164X + 744.865 \quad (5)$$

$$Y \geq 33350.000X^5 - 67572.804X^4 + 54585.538X^3 - 21975.309X^2 + 4409.171X - 352.671 \quad (6)$$

6. A master for optical recording medium manufacture used when manufacturing an optical recording medium having grooves formed along recording tracks and being applied with light having a predetermined wavelength $\lambda$ for performing recording and/or reproduction, the master characterized in that,
   as the grooves, first and second grooves and a third groove shallower than the first second grooves are formed so as to be arranged adjacently, and
   a signal is recorded to the first and second grooves and two lands between the first groove and the third groove and between the second groove and the third groove.

7. The master for optical recording medium manufacture according to claim 6, characterized in that at least one of the first and second grooves and the third groove is a wobble groove formed so as to wind.

8. The master for optical recording medium manufacture according to claim 6, characterized in that, assuming that a numerical aperture of an objective lens used for recording and/or reproduction is NA and a wavelength of light is $\lambda$, a spatial frequency of a track pitch is higher than a cutoff frequency expressed by $2 \times NA/\lambda$.

9. The master for optical recording medium manufacture according to claim 6, characterized in that a width of each of the two lands and a top width of the first and second grooves are substantially the same.

10. The master for optical recording medium manufacture according to claim 6, characterized in that, assuming that a refractive index of a medium from a light entrance surface to the grooves is n, a depth coefficient of the first and second grooves is x, $x \times n/\lambda$ is a phase depth X of the first and second grooves, a depth coefficient of the third groove is y, and $y \times n/\lambda$ is a phase depth Y of the third groove, the depth coefficient x of the first and second grooves and the depth coefficient y of the third groove satisfy the following expressions (7) and (8)

$$Y \leq -55081.936X^5 + 117717.139X^4 - 100176.653X^3 + 42397.950X^2 - 8916.164X + 744.865 \quad (7)$$

$$Y \geq 33350.000X^5 - 67572.804X^4 + 54585.538X^3 - 21975.309X^2 + 4409.171X - 352.671 \quad (8)$$

11. A recording/reproducing apparatus for an optical recording medium having grooves formed along recording tracks and being applied with light having a predetermined wavelength $\lambda$ for performing recording and/or reproduction, the apparatus characterized in that, as the grooves, first and second grooves and a third groove shallower than the first and second grooves are formed so as to be arranged adjacently, and a signal is recorded to the first and second grooves and two lands between the first groove and the third groove and between the second groove and the third groove.

12. The recording/reproducing apparatus according to claim 11, characterized in that at least one of the first and second grooves and the third groove is a wobble groove formed so as to wind, and a wobble signal is reproduced from the wobble groove.

13. The recording/reproducing apparatus according to claim 11, characterized in that tracking servo is performed with a push-pull signal.

14. A recording/reproducing method for an optical recording medium having grooves formed along recording tracks and being applied with light having a predetermined wavelength $\lambda$ for performing recording and/or reproduction, the method characterized in that, as the grooves, first and second grooves and a third groove shallower than the first and second grooves are formed so as to be arranged adjacently, and a signal is recorded to the first and second grooves and two lands between the first groove and the third groove and between the second groove and the third groove.

15. The recording/reproducing method according to claim 14, characterized in that at least one of the first and second grooves and the third groove is a wobble groove formed so as to wind, and a wobble signal is reproduced from the wobble groove.

16. The recording/reproducing method according to claim 14, characterized in that tracking servo is performed with a push-pull signal.

* * * * *